US011887507B2

(12) United States Patent
Shiffman et al.

(10) Patent No.: US 11,887,507 B2
(45) Date of Patent: Jan. 30, 2024

(54) VIRTUAL REALITY LAW ENFORCEMENT TRAINING SYSTEM

(71) Applicant: V-Armed Inc., New York, NY (US)

(72) Inventors: Rotem Shiffman, New York, NY (US); Elad Dabush, Herzliya (IL)

(73) Assignee: V-ARMED INC.

( * ) Notice: Subject to any disclaimer, the term of this patent is extended or adjusted under 35 U.S.C. 154(b) by 234 days.

(21) Appl. No.: 17/070,030

(22) Filed: Oct. 14, 2020

(65) Prior Publication Data

US 2022/0114905 A1 Apr. 14, 2022

(51) Int. Cl.
| | |
|---|---|
| *G06T 19/00* | (2011.01) |
| *G09B 9/00* | (2006.01) |
| *G06T 7/70* | (2017.01) |
| *G02B 27/01* | (2006.01) |
| *G06F 1/16* | (2006.01) |
| *G06F 3/0486* | (2013.01) |
| *G06F 3/16* | (2006.01) |
| *G06T 19/20* | (2011.01) |

(52) U.S. Cl.
CPC ......... *G09B 9/003* (2013.01); *G02B 27/0172* (2013.01); *G06F 1/163* (2013.01); *G06F 3/0486* (2013.01); *G06F 3/167* (2013.01); *G06T 7/70* (2017.01); *G06T 19/006* (2013.01); *G06T 19/20* (2013.01); *G06T 2219/024* (2013.01)

(58) Field of Classification Search
CPC ..... G09B 9/003; G02B 27/0172; G06F 1/163; G06F 3/0486; G06F 3/167; G06T 7/70; G06T 19/006; G06T 19/20; G06T 2219/024
See application file for complete search history.

(56) References Cited

U.S. PATENT DOCUMENTS

| | | | |
|---|---|---|---|
| 9,530,326 B1 * | 12/2016 | Ramloll | G06F 3/04842 |
| 2006/0017654 A1 * | 1/2006 | Romo | G06F 3/016 |
| | | | 345/592 |
| 2015/0260474 A1 * | 9/2015 | Rublowsky | A63F 13/837 |
| | | | 434/16 |
| 2017/0319956 A1 * | 11/2017 | Vandonkelaar | G06V 10/255 |
| 2019/0279428 A1 * | 9/2019 | Mack | G06T 7/90 |
| 2020/0193854 A1 * | 6/2020 | Salinas Vela | G09B 5/125 |

* cited by examiner

*Primary Examiner* — Jennifer N Welch
*Assistant Examiner* — Amy P Hoang
(74) *Attorney, Agent, or Firm* — Gearhart Law, LLC; David Postolski

(57) ABSTRACT

A virtual reality system for use with law enforcement training is described. Simulation software receives a selection of a base scenario layout from a first user and an action associated with a parameter of the scenario to modify the scenario. The simulation software transmits the modified scenario to a user interface of a head-mounted display worn by a second user freely roaming a physical environment of the virtual reality system. The physical environment is defined at least partially by a physical coordinate system. The simulation software receives position data associated with an object and captured by one or more cameras within the physical environment, determines a position of the object from the position data, generates a virtual reality image of the object, adds the virtual reality image of the object into the modified scenario, and transmits the updated scenario to the user interface of the head-mounted display.

19 Claims, 15 Drawing Sheets

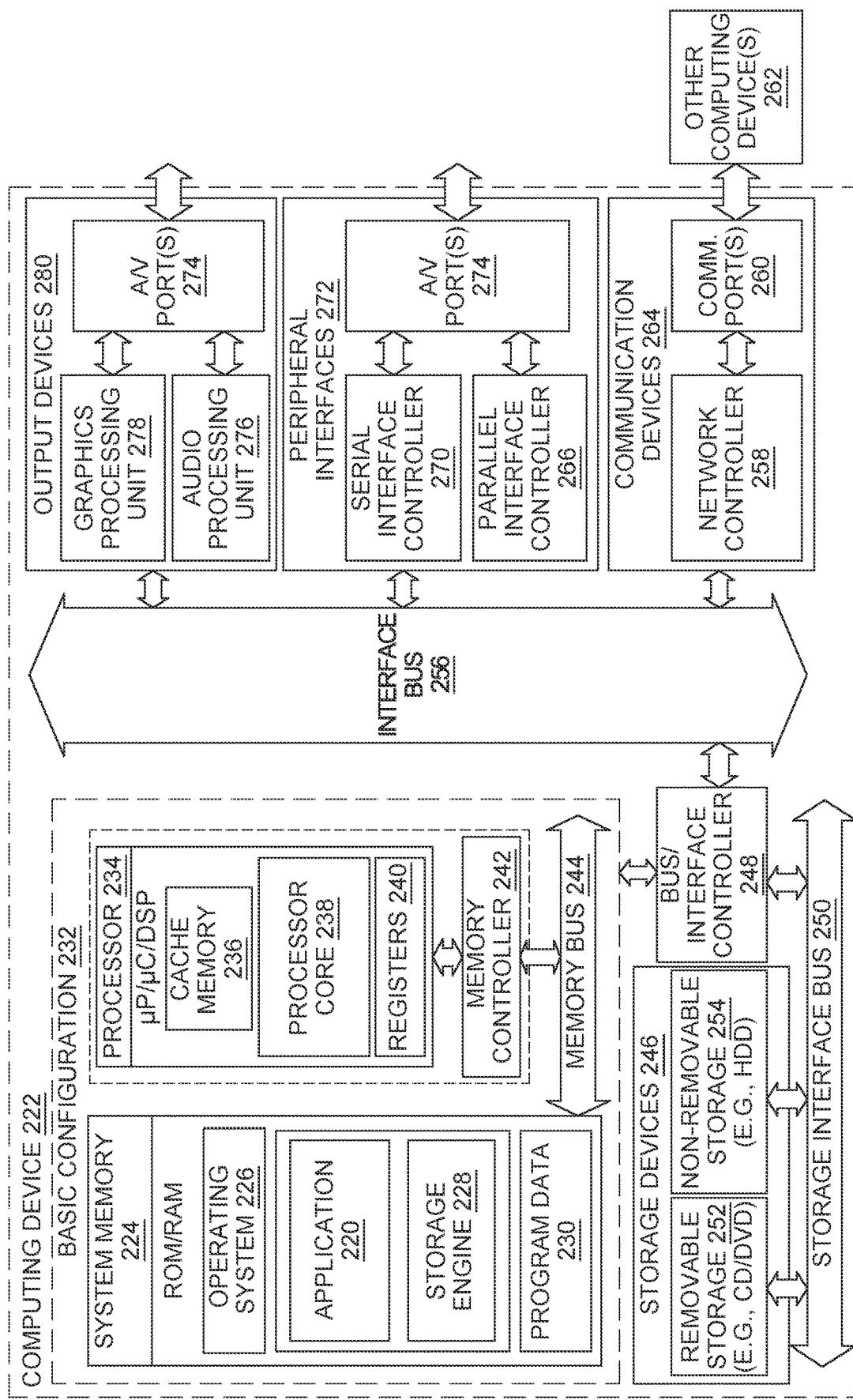

VIRTUAL REALITY LAW ENFORCEMENT TRAINING SYSTEM

FIELD OF THE EMBODIMENTS

This invention relates to virtual reality ("VR") training systems. In particular, the present invention relates towards multi-participant and free-roaming VR training systems within the area of law enforcement.

BACKGROUND OF THE EMBODIMENTS

VR is a technology for displaying a virtual environment or a scenario to a user, where the virtual environment appears to be a real or true environment. The virtual image or image signal is generated by a computer that allows a user to dissociate himself or herself from a physical environment and act as if in the virtual reality environment. A virtual reality may include audio and haptic components, in addition to a visual component.

To create a virtual world with virtual images, images and textures are traditionally programmed into graphics engines. Additionally, images may be created from digitized photos, video, or scanned images. These virtual images and their three-dimensional (3D) characterizations are stored in computer memory. These stored images are manipulated to produce a virtual reality image signal that is presented for display to the user often as a result of a user input or under computer programmed control.

The visual component of a virtual reality system may be displayed either on a computer screen or with a stereoscopic head-mounted display. Some conventional head-mounted displays simply project an image or symbology on a wearer's visor or reticle, where the projected image does not change based on the wearer's head position. Other head-mounted displays may incorporate a positioning system that tracks the user or wearer's head position and angle, so that the picture or symbology projected by the display is congruent with the outside world using see-through imagery.

Head-mounted displays may also be used with tracking sensors that allow changes of angle and orientation of the wearer to be recorded. When such data is available to the system providing the virtual reality environment, it can be used to generate a display that corresponds to the user or wearer's angle-of-look at the particular time. This allows the wearer to "look around" a virtual reality environment simply by moving the head without the need for a separate controller to change the angle of the imagery.

Virtual reality systems may be wired or wireless. Such wireless systems allow the user or participant to move freely about or freely roam within tracking limits of the system. Appropriately placed sensors or indicators allow the virtual reality system to track movements and actions of the participant, allowing for natural interactions with content.

However, the scenarios generated by the virtual reality systems are often static and cannot be easily manipulated by users. Such systems fail to provide client-facing authoring tools, allowing the user to replay the scenario (e.g., for training purposes) and modify aspects or parameters of the scenario. Additionally, such systems fail to provide client-facing authoring tools geared towards multi-participant and free-roaming VR within the law enforcement training arena.

Examples of related art are described below:

U.S. Pat. No. 5,759,044 A describes a system for generating and processing synthetic and absolute real-time remote environments for interaction with a user. Various modules track user data to accurately place the user in the generated and processed model. This system may be used in law enforcement applications (e.g., solving crimes by re-enactment of events, securing witnesses, and/or protecting their identities).

U.S. Published Patent Application No. 2006/0017654 A1 describes a VR interactivity system and method of operation. The system includes position indicators that indicate positions in a physical coordinate system, each being associated with one object of a plurality of objects located within the physical environment mapped by the physical coordinate system. The system also includes a position communication system that communicates the positions of the position indicators. The system further includes a VR user module associated with a user positioned within the physical environment. The VR user module determines a position of an object within the physical coordinate system as a function of the position signals. The user module determines a position of an associated object within the VR coordinate system and generates a VR image signal that includes the determined position of the associated object within the VR coordinate system. The user module also includes a VR user interface that displays a VR image to the user as a function of the VR image signal. This VR technology may be used in numerous fields, including: military training simulations and/or law enforcement training simulations.

EP 3,537,263 A3 describes a system and method for presenting an augmented reality view. The system may include a database for personalizing an augmented reality view of a physical environment using a location of a physical environment and/or a location of a user. The system may further include a hardware device in communication with the database. The hardware device may include a renderer configured to render the augmented reality view for display and a controller configured to determine a scope of the augmented reality view, authenticating the augmented reality view. The hardware device may further include a processor configured to receive the augmented reality view of the physical environment, and present, via a display, augmented reality content to the user while the user is present in the physical environment, based on the determined scope of the augmented reality view.

U.S. Pat. No. 10,441,868 B2 describes a VR system for providing law enforcement training to players.

CN 106710351 A describes a VR police service training device that includes head-wearing display equipment, tracing equipment, an operating handle, a communication module, and a mainframe. The head-wearing display equipment is used for providing a stereo image having a binocular parallax. The tracing equipment is used for tracing the body posture of a user. The operating handle is used for transmitting position and control signals to the mainframe. The communication module is used for communication between all equipment. The mainframe is used for receiving the position and control signals from the operating handle and generating the stereo image.

WO 2019/099912 A1 describes a system and method to render a three-dimensional (3D) virtual environment for military training use.

WO 2007/133209 A1 describes a method for using augmented reality (AR), in conjunction with a real or simulated thermal imager. Primary applications of this invention include training: emergency first responders, military personnel, and/or law enforcement personnel.

EP 1,960,063 A2 describes a system configured to simulate military training situations. The system includes an interface, an effector having at least one sensor, a platform, and control circuitry that includes a processor. The platform accommodates a user in a standing position and includes the effector attached thereto. The sensor measures at least one force applied by a lower body portion of a user to the effector, causing a measurable strain on the effector. An additional effector with at least one sensor and a game controller may further be attached to the platform. The sensor measures at least one force applied by an upper body portion of a user to the additional effector, causing a measurable strain on that effector. The processor receives and processes data corresponding to applied force information for transference to the host computer system to update a VR scenario.

U.S. Pat. No. 8,651,964 B2 describes a video control system that allows for a realistic experience in a video environment, in which movement of the video player is replicated and appreciated on a video screen. The user is completely untethered from the game computer and has complete 3-D freedom within a thirty foot radius of the game computer. This provides a realistic physical dimension to a video game system, which can be used for realistic military and law enforcement training or commercial game playing applications.

None of the art described above teaches the system or method described in this present invention.

SUMMARY OF THE EMBODIMENTS

The present invention and its embodiments relate to VR training systems. In particular, the present invention relates towards multi-paricipiant and free-roaming VR training systems within the area of law enforcement.

A first embodiment of the present invention describes a virtual reality system. The virtual reality system includes a physical environment defined at least partially by a physical coordinate system. The physical environment may include one or more physical objects. Additionally, one or more users may be located in the physical environment. The virtual reality system may also include a first computing device communicatively coupled to a server.

A simulation engine, application, software program, service, or a software platform is executable on the first computing device. The software engine is configured to control a scenario for the virtual reality system. In examples, the scenario is a simulation scenario. Additionally, the simulation scenario may be a video gaming simulation scenario, a situational awareness training simulation scenario, an entertainment simulation scenario, a military training simulation scenario, a law enforcement training simulation scenario, a fire fighter training simulation scenario, a flight simulation scenario, a science education simulation scenario, a medical training simulation scenario, a medical response simulation scenario, a mission rehearsal simulation scenario, or an architectural training simulation scenario, among others not explicitly listed herein. In preferred embodiments, the scenario is the law enforcement training simulation scenario.

Each of the one or more users are configured with wearable devices and a weapon (or a peripheral). The wearable devices include a virtual reality head-mounted display, a backpack, at least one ankle strap, and at least one wrist strap. In examples, the virtual reality head-mounted display includes a user interface configured to display the scenario to the wearer. The user interface also displays virtual reality images of one or more physical objects (e.g., a doorway, a door, a surface, etc.), one or more users/ participants, wearable devices associated with the users/ participants, and/or weapons associated with the users/participants to the user/participant while the user is engaging with the virtual reality system. The virtual reality head-mounted display also includes a headset configured to transmit audio to the user/wearer while the user/wearer is engaging with the virtual reality system. Moreover, each of the wearable devices and the weapon comprise a position indicator or sensor configured to detect position data in the physical environment of the system.

The physical environment includes one or more network switches, one or more cameras, and one or more base stations. The one or more cameras are configured to: monitor a portion of the physical environment and capture the position data of each position indicator and each of the one or more physical objects, the one or more users, the wearable devices, and/or the weapon associated with the user/participant within the portion of the physical environment. The one or more cameras are then configured to transmit the position data of each position indicator within the portion of the physical environment to a first network switch.

The one or more base stations are affixed to a second network switch and are configured to emit radio frequency signals to synchronize each position indicator within the physical environment. A third network switch is affixed to the first network switch and the second network switch and is configured to transmit the position data of each position indicator within the portion of the physical environment to the first computing device.

A second embodiment of the present invention describes a method executed by a simulation engine of a computing device for providing a virtual reality system. The method includes: receiving a selection of a base layout of a scenario from a first user and receiving an action associated with a parameter of the scenario. The scenario may be a three-dimensional (3D) scenario. In examples, the action is a drag and drop action to add the parameter to the scenario or delete the parameter from the scenario. In other examples, the action is a modification action, a deletion action, or an addition action. The parameter may be an asset, an audio stimuli, or a visual stimuli. In examples, the asset is a character asset, a vehicle asset, or an environmental asset. The simulation engine may then execute the action to modify the scenario.

The simulation engine may then transmit the modified scenario to the user interface of the head-mounted display worn by the user/participant freely roaming the physical environment. The simulation engine may then receive position data associated with an object (e.g., the user/participant, the wearable device worn by the user/participant, the weapon used by the user/participant, and/or the physical object) and captured by the one or more cameras within the physical environment. The wearable device may be a backpack, at least one ankle strap, and/or at least one wrist strap.

The simulation engine may then determine a position of the object from the position data, generate a virtual reality image of the object, add the virtual reality image of the object into the modified scenario, and transmit the updated scenario to the user interface of the head-mounted display worn by the user/participant. In further examples, the simulation engine may generate an audio signal associated with the virtual reality image of the object and may transmit the audio signal to the headset coupled to the head-mounted display for the user/participant to hear while engaging in the virtual reality system.

The simulation engine may further transmit the scenario to a graphical user interface (GUI) of another computing device for display to another user. Next, the simulation engine may receive, from the other user, the one or more actions to modify the parameter of the scenario. In response to such, the simulation engine may update the scenario based on the one or more actions.

A third embodiment of the present invention describes a computing device. The computing device includes one or more processors, one or more memories, and one or more computer-readable hardware storage devices. The one or more computer-readable hardware storage devices contain program code executable by the one or more processors via the one or more memories to implement a method for providing a virtual reality system. The method includes: receiving a selection of a base layout of a 3D scenario from a first user and receiving an action (e.g., an addition action, a modification action, or a deletion action) associated with a parameter (e.g., an asset, an audio stimuli, or a visual stimuli) of the 3D simulation scenario. The asset may include: a character asset, a vehicle asset, or an environmental asset. Further, the 3D simulation scenario is a law enforcement training simulation scenario.

The method may further include: executing the action to modify the 3D simulation scenario and transmitting the modified 3D simulation scenario to the user interface of the head-mounted display worn by a second user freely roaming the physical environment of the virtual reality system. The physical environment is defined at least partially by a physical coordinate system.

The method may then include receiving position data associated with an object (e.g., the second user, the wearable device worn by the second user, the weapon used by the second user, or the physical object, such as a doorway, a doorknob, a door, a surface, etc.) and captured by one or more cameras within the physical environment. The method then determines a position of the object from the position data, generates a virtual reality image of the object, adds the virtual reality image of the object into the modified 3D simulation scenario, and transmits the updated 3D simulation scenario to the user interface of the head-mounted display worn by the second user.

The method may additionally include: transmitting the 3D simulation scenario to the GUI of another computing device for display to a third user. In response to receiving, from the third user, the one or more actions (e.g., the addition action, the modification action, or the deletion action) to modify the parameter of the 3D simulation scenario, the method may further include updating the 3D simulation scenario based on the one or more actions.

In general, the present invention succeeds in conferring the following benefits and objectives.

It is an object of the present invention to provide a VR training system.

It is an object of the present invention to provide a VR training system in the field of law enforcement training.

It is an object of the present invention to provide a multi-paricipiant and free-roaming VR system within the law enforcement training arena.

It is an object of the present invention to provide a VR software that is fully user-customizable.

It is an object of the present invention to provide a VR software that is user-friendly.

BRIEF DESCRIPTION OF THE DRAWINGS

FIG. 15 depicts a block diagram of a computing device for use in a virtual reality system, according to at least some embodiments disclosed herein.

DESCRIPTION OF THE PREFERRED EMBODIMENTS

Figure 1:
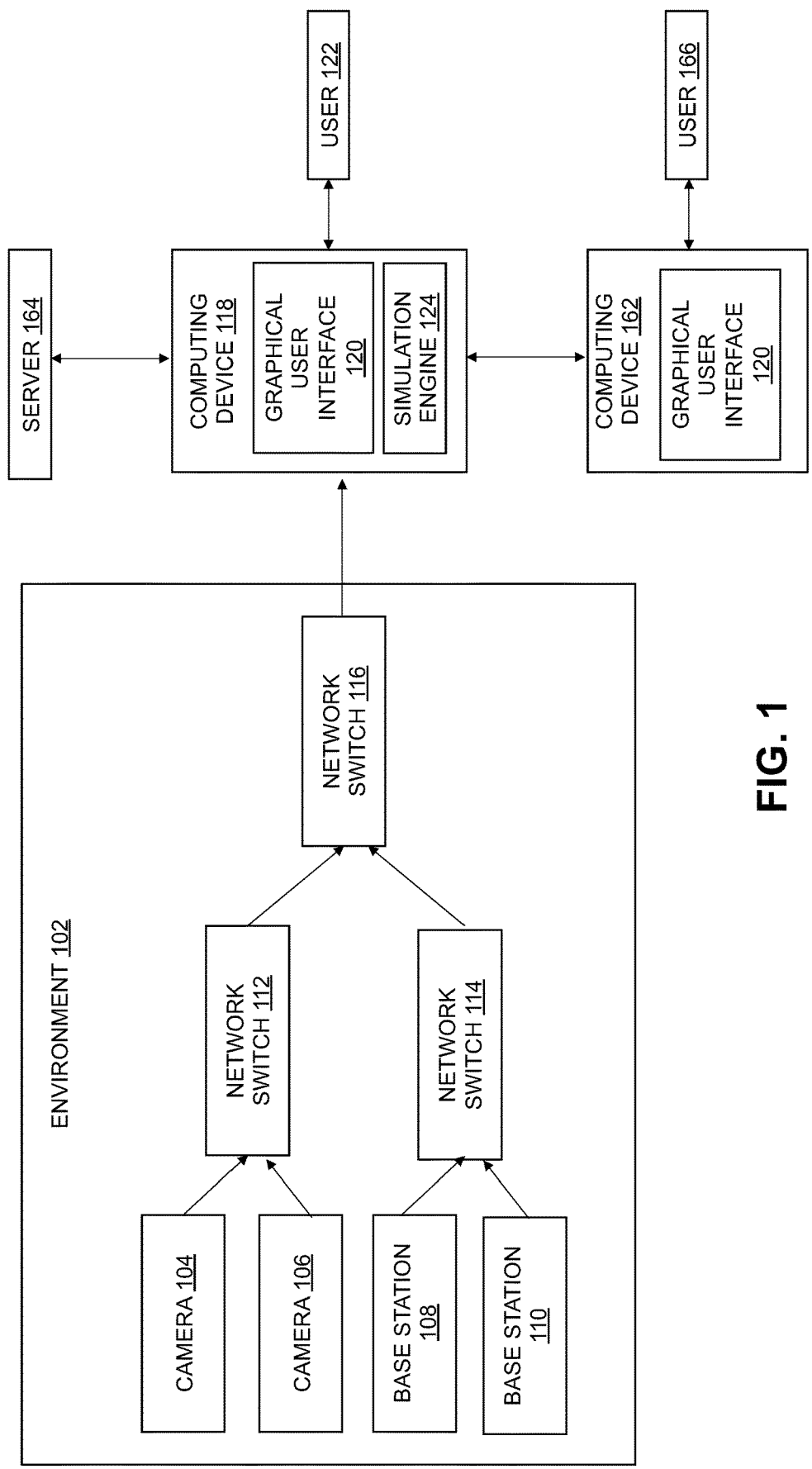
FIG. 1 depicts a block diagram of a virtual reality system, according to at least some embodiments disclosed herein.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As used herein, the singular forms "a," "an," and "the," are intended to include the plural forms as well, unless the context clearly indicates otherwise.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, an "embodiment" means that a particular feature, structure or characteristic is included in at least one or more manifestations, examples, or implementations of this invention. Furthermore, the particular features, structures or characteristics may be combined in any suitable manner, as would be apparent to a person skilled in the art. Combinations of features of different embodiments are all meant to be within the scope of the invention, without the need for explicitly describing every possible permutation by example. Thus, any of the claimed embodiments can be used in any combination.

The phrase "and/or," as used herein in the specification and in the claims, should be understood to mean "either or both" of the elements so conjoined, e.g., elements that are conjunctively present in some cases and disjunctively present in other cases. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Virtual reality (or "VR") is a technology for displaying a virtual environment to a user, where the virtual environment appears to be a real or true environment. The virtual image or image signal is generated by a computer or a computing device that allows the user or participant to dissociate himself or herself from a physical environment and act as if in the virtual reality environment. A virtual reality may include audio and haptic components, in addition to a visual component.

An example of one such virtual reality system is described and depicted herein. The virtual reality system may be embodied or implemented in a variety of devices, systems, and methods. The virtual reality system includes a physical environment 102 (as depicted in FIG. 1, FIG. 2, FIG. 3, FIG. 4, and FIG. 8). The physical environment 102 is defined at least partially by a physical coordinate system. The physical coordinate system may be either two-dimensional (2D) (e.g., x, y) or three-dimensional (3D) (e.g., x, y, z). It should be appreciated that the physical environment 102 may be any space, such as an open room or a warehouse.

Figure 2:
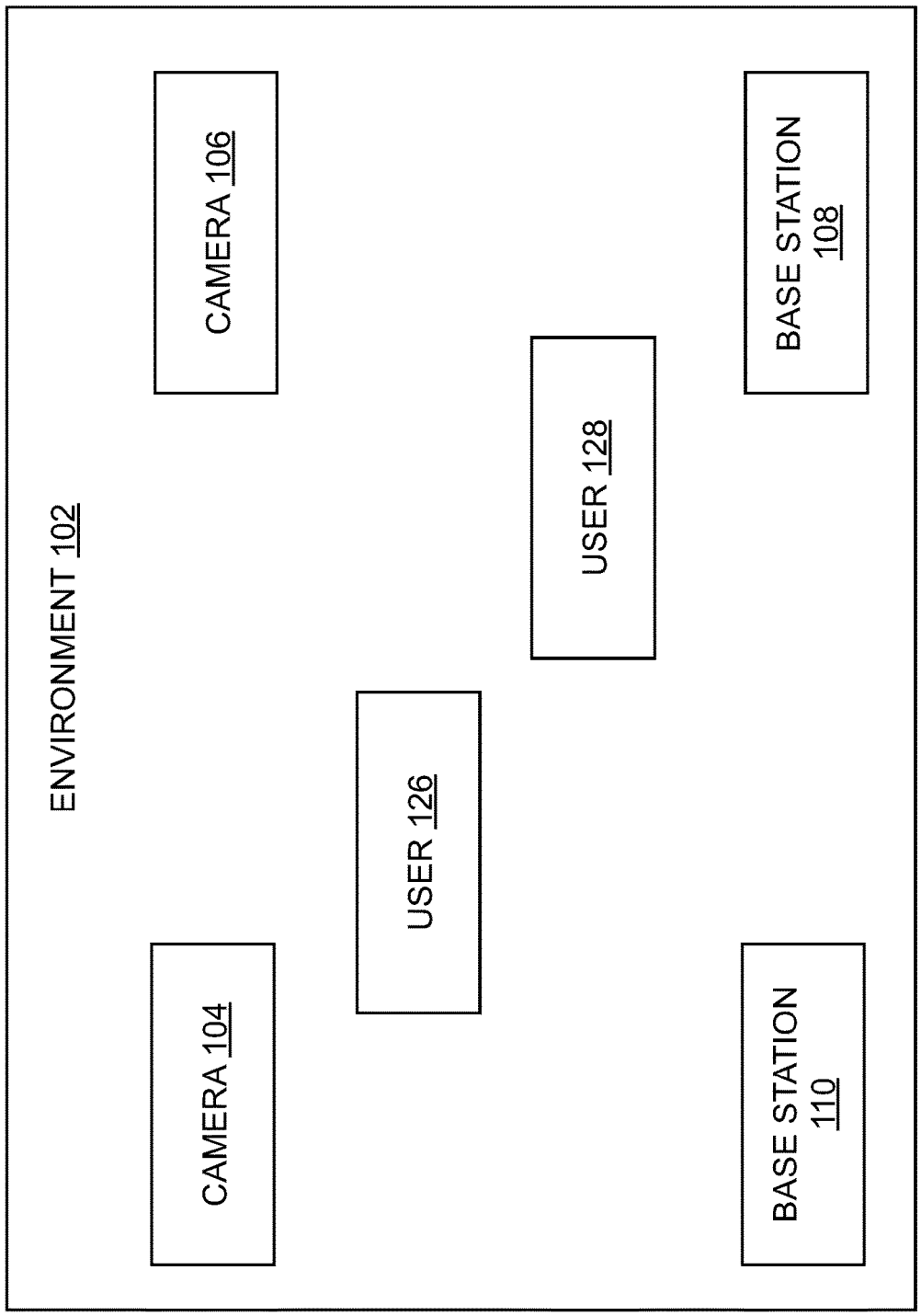
FIG. 2 depicts a block diagram of a physical environment of a virtual reality system, according to at least some embodiments disclosed herein.
Figure 4:
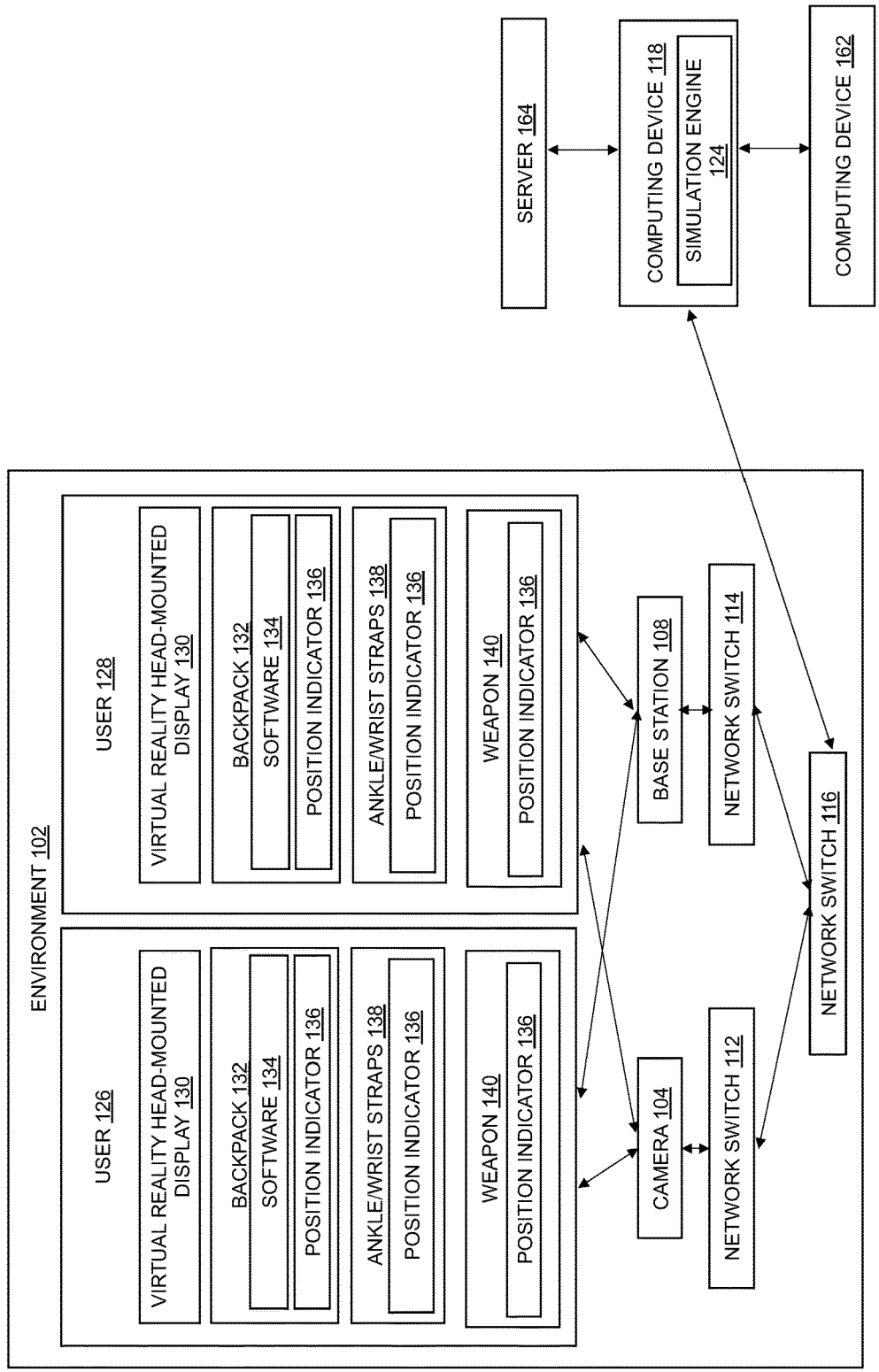
FIG. 4 depicts another block diagram of a virtual reality system, according to at least some embodiments disclosed herein.

A plurality of objects may be located in the physical environment 102. The plurality of objects may each have a position on the physical coordinate system. The plurality of objects may include one or more cameras (such as a first camera 104 and/or a second camera 106) (as depicted in FIG. 1, FIG. 2, FIG. 4, and FIG. 8) and one or more base stations (such as a first base station 108 and/or a second base station 110) (as depicted in FIG. 1, FIG. 2, and FIG. 4). Each of the first camera 104 and the second camera 106 may be strategically placed around the physical environment 102 so as to monitor a portion of the physical environment 102 defined at least partially by the physical coordinate system. For example, the first camera 104 and the second camera 106 may be placed so that their views overlap the portion of the physical environment 102. In examples, clamps (not shown) may affix the first camera 104 and/or the second camera 106 to trusses (not shown) placed within the physical environment 102. An entirety of the physical environment 102 may be captured by the cameras.

In some examples, the first camera 104 and/or the second camera 106 may be motion capture cameras. It should further be appreciated that the first camera 104 and/or the second camera 106 and/or the first base station 108 and/or the second base station 110 may require pre-programming prior to use.

The base stations (such as the first base station 108 and the second base station 110) may be configured to emit signals (such as radio frequency signals) to synchronize a position indicator 136 or sensor (as depicted in FIG. 3, FIG. 4, FIG. 5, and FIG. 6) associated with objects within the physical environment 102. Each radio frequency channel of the first base station 108 and the second base station 110 must also be programmed to ensure that each of the first base station 108 and the second base station 110 is differentiated from one another.

Figure 3:
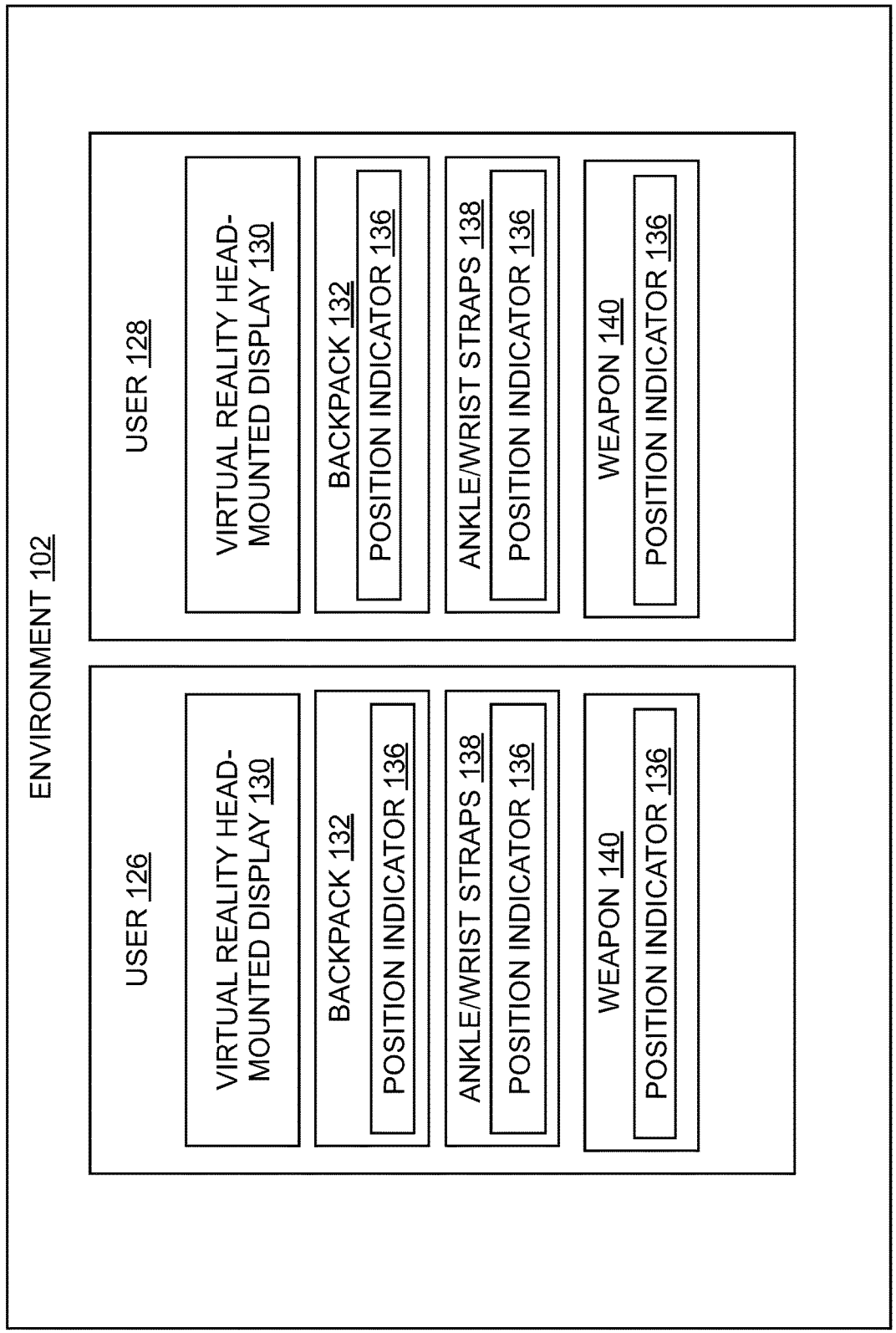
FIG. 3 depicts a block diagram of a first user and a second user within a physical environment of a virtual reality system, the first user and the second user being associated with wearable devices and at least one peripheral or weapon, according to at least some embodiments disclosed herein.
Figure 5:
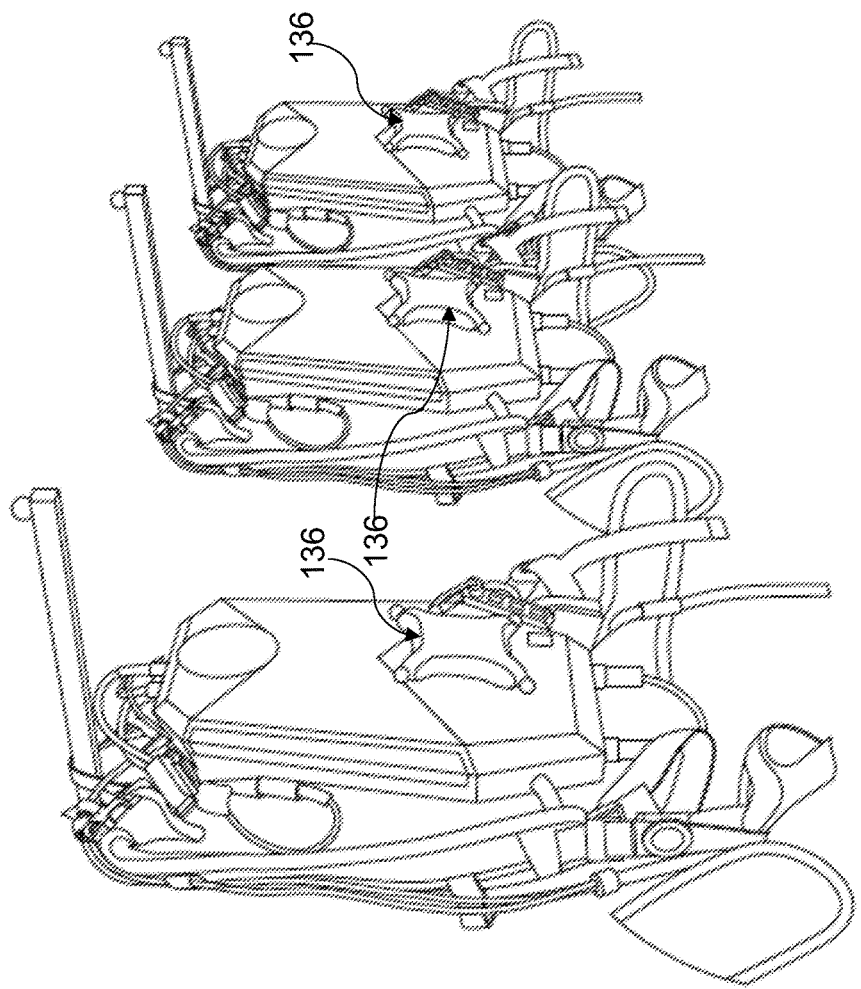
FIG. 5 depicts a schematic diagram of a backpack comprising a position indicator for use in a virtual reality system, according to at least some embodiments disclosed herein.
Figure 5:
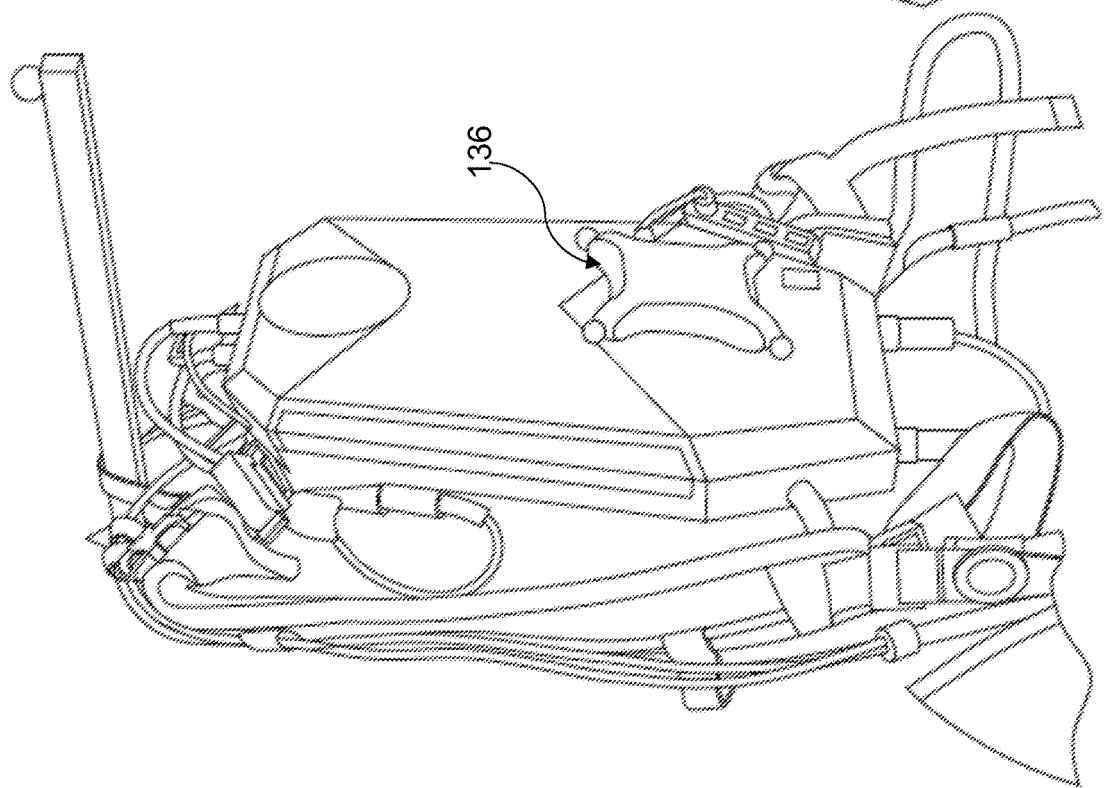
Figure 6:
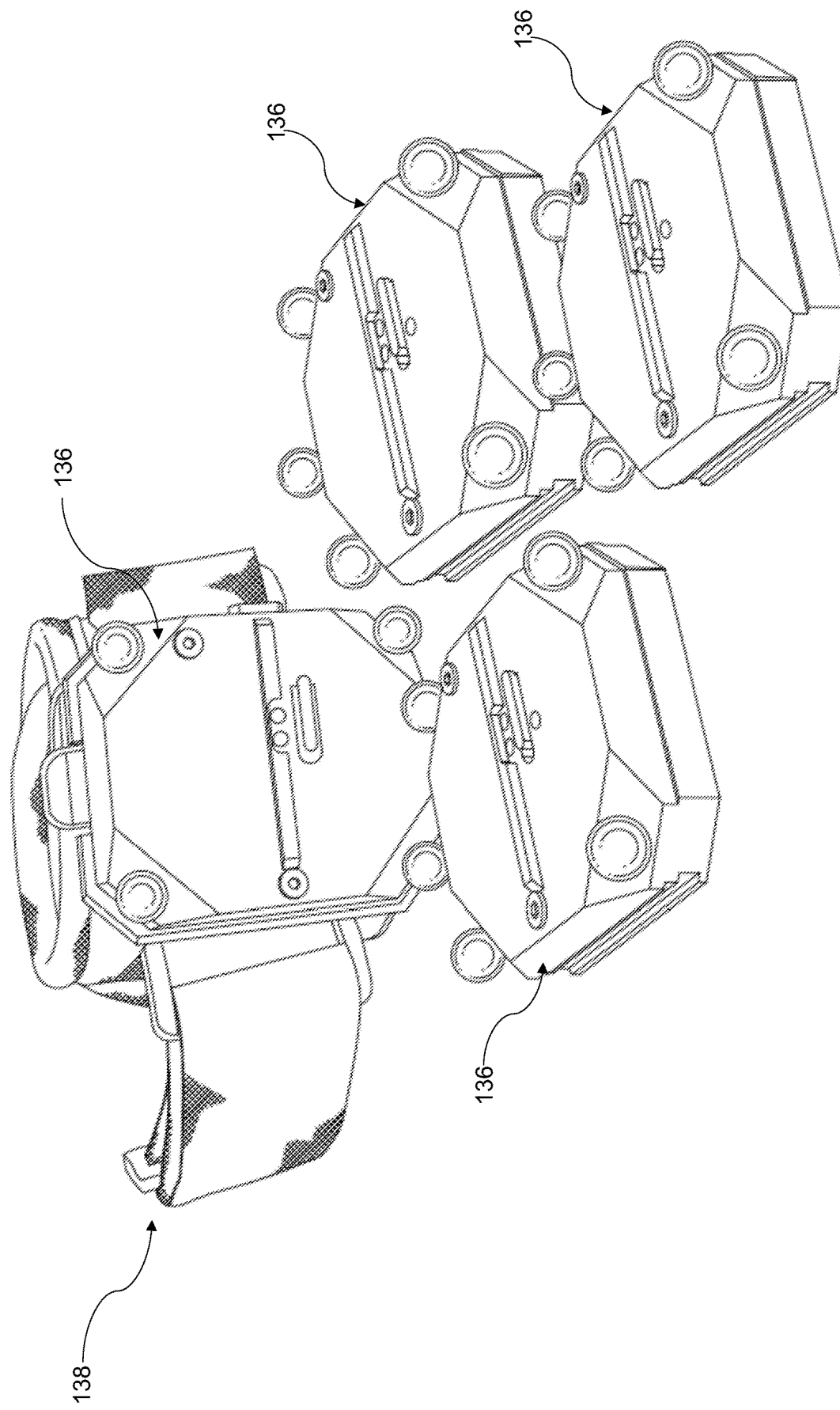
FIG. 6 depicts a schematic diagram of an ankle/wrist strap comprising a position indicator for use in a virtual reality system, according to at least some embodiments disclosed herein.
Figure 7:
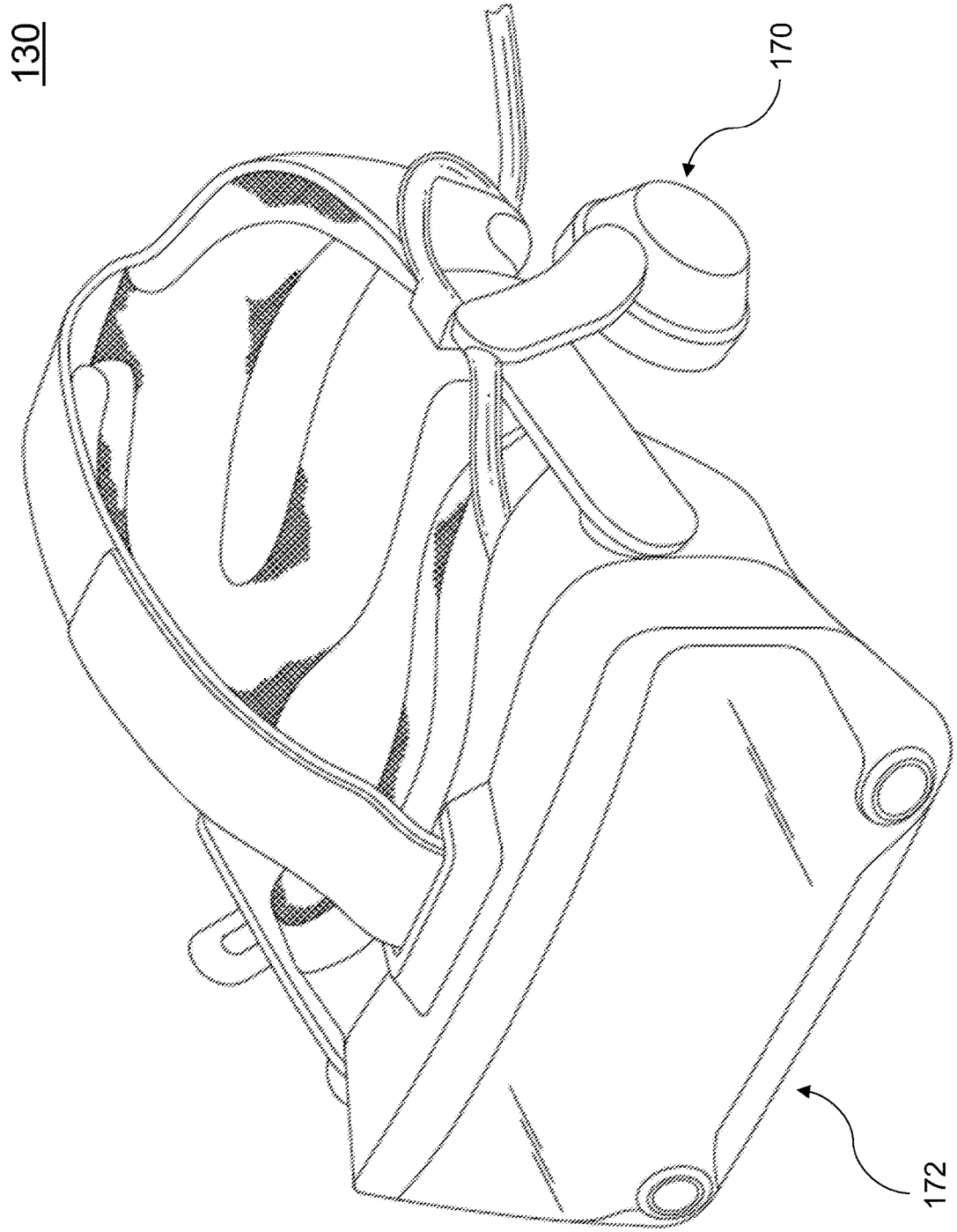
FIG. 7 depicts a schematic diagram of a head-mounted display for use in a virtual reality system, according to at least some embodiments disclosed herein.
Figure 8:
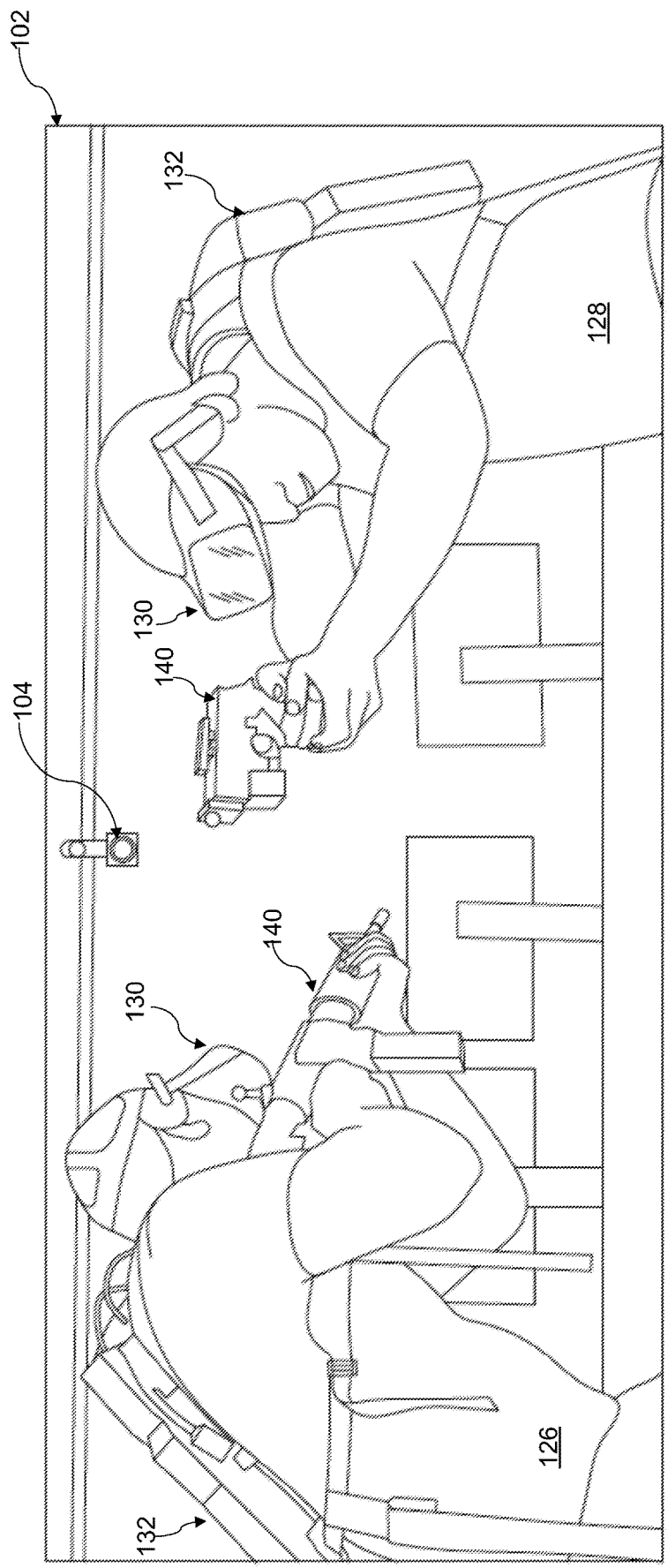
FIG. 8 depicts a schematic diagram of a first user and a second user within a physical environment of a virtual reality system, the first user and the second user being associated with wearable devices and at least one weapon, according to at least some embodiments disclosed herein.

The objects may include a first user 126, a second user 128, other users, one or more wearable devices worn by one or more of the users, a peripheral or weapon 140 used by one or more of the users, and/or a physical object (e.g., a doorway, a wall, a ceiling, a floor, a doorknob, a steering wheel, a step, a surface, a freely movable object, a desk, a table, and/or a door), among other examples not explicitly listed herein. In examples, the one or more wearable devices may include: a backpack 132, a head-mounted display 130, and one or more ankle/wrist straps 138, among other examples not explicitly listed herein. The first user 126 and the second user 128 are depicted, at least, in FIG. 2, FIG. 3, FIG. 4, and FIG. 8. The weapon 140 is depicted, at least, in FIG. 3, FIG. 4, FIG. 8, and FIG. 9. The backpack 132 is depicted in FIG. 3, FIG. 4, FIG. 5, and FIG. 8. The head-mounted display 130 is depicted in FIG. 3, FIG. 4, FIG. 7, and FIG. 8. The one or more ankle/wrist straps 138 are depicted in FIG. 3, FIG. 4, and FIG. 6.

The first camera 104 and/or the second camera 106 may be affixed to a first network switch 112 via cabling, such as an Ethernet cable. The first network switch 112 may also be configured to supply power to each of the first camera 104 and/or the second camera 106. The first base station 108 and the second base station 110 may be affixed to a second network switch 114 via cabling, such as the Ethernet cable. A third network switch 116 may be affixed to the first network switch 112 and the second network switch 114. The first network switch 112, the second network switch 114, and the third network switch 116 are depicted in FIG. 1 and FIG. 4.

In additional examples, the virtual reality system described herein is a free-roaming virtual reality system such that one or more users (e.g., the first user 126 and/or the second user 128) may walk around freely in the physical coordinate system while engaging with the virtual reality system without the limits of obstructive cables or constraints. As such, the virtual reality system allows for a fully immersive experience for single or multi-participant use. It should be appreciated that a quantity of users engaging with the virtual reality system during a time period is non-limiting.

In examples, the volume of the physical environment 102 must be calibrated prior to use of the virtual reality system. During calibration, the virtual reality system may compute the position and orientation of each of the first camera 104 and/or the second camera 106 in relation to each other and the ground, thus creating the 3D capture volume. If there are any changes in a setup of the first camera 104 and/or the second camera 106 over the course of capture, the whole system will need to be recalibrated to accommodate for changes. This calibration may also naturally deteriorate over time due to many ambient factors, such as temperature and camera movement.

Additionally, prior to use of the virtual reality system, a boundary of the physical environment 102 for a scenario 148 must be determined to ensure that the in game boundary that appears when the first user 126 and/or the second user 128 get too close to the end of the physical space match the physical space. To define the boundary, one user (such as the first user 126) may wear the one or more wearable devices and may hold the peripheral or the weapon 140. The user (e.g., the first user 126) may then be launched into the desired scenario. The user (e.g., the first user 126) may then stand in a corner of the capture volume. The user (e.g., the first user 126) may then walk to each corner of the space of the physical environment 102 to create a shape for the capture volume and then return to the original corner, thus creating an outline of the shape of the physical environment 102. It should be appreciated that this process may be repeated several times.

As explained, other objects (e.g., the doorway, the wall, the ceiling, the floor, etc.) may be present in the physical environment 102, each of which have a position on the physical coordinate system. The first user 126 and/or the second user 128 may engage with the object (e.g., the doorway) when engaging with the free-roaming virtual reality system. It should be appreciated that a position indicator 136 may be associated with or affixed to each of one or more physical objects (such as the backpack 132, the head-mounted display 130, the one or more ankle/wrist straps 138, the weapon 140, the doorway, the wall, the ceiling, the floor, and/or the doorknob, etc.). The position indicator 136 may be depicted in FIG. 3, FIG. 4, FIG. 5, and FIG. 6. A shape and size of the position indicator 136 is not limited to the shape and size depicted herein. In other examples, the backpack 132 may comprise an electronic device. As depicted in FIG. 4, software 134 may be executable on the electronic device to assist in the virtual reality system.

The position indicator 136 may be affixed to each of the one or more physical objects via Velcro, an adhesive, a strap, a clasp, a zipper, or another method. As an illustrative example, the position indicator 136 may be affixed to the backpack 132 via Velcro (as depicted in FIG. 5). In another example, the position indicator 136 may be affixed to the one or more ankle/wrist straps 138 via a strap (as depicted in FIG. 6). In other examples, the position indicator 136 may be incorporated into the one or more physical objects. It should be appreciated that these examples are provided for illustrative purposes only and other examples are contemplated. It should further be appreciated that each position indicator 136 may require pre-programming prior to use. It should be appreciated that biometric sensors may be used in addition to, or alternative to, the position indicator 136. The appropriately placed position indicators 136 allow the virtual reality system to track movements of the wearer/user (e.g., the first user 126 and/or the second user 128) to allow natural interaction with content.

Each of the first camera 104 and the second camera 106 are configured to capture position data of the position indicator 136 within the portion of the physical environment 102. The position indicator 136 may identify a location, may track, and/or may detect a movement of the one or more physical objects within the portion of the physical environment 102. The first camera 104 and the second camera 106 may transmit the position data of each position indicator 136 within the portion of the physical environment 102 to the first network switch 112.

Figure 10:
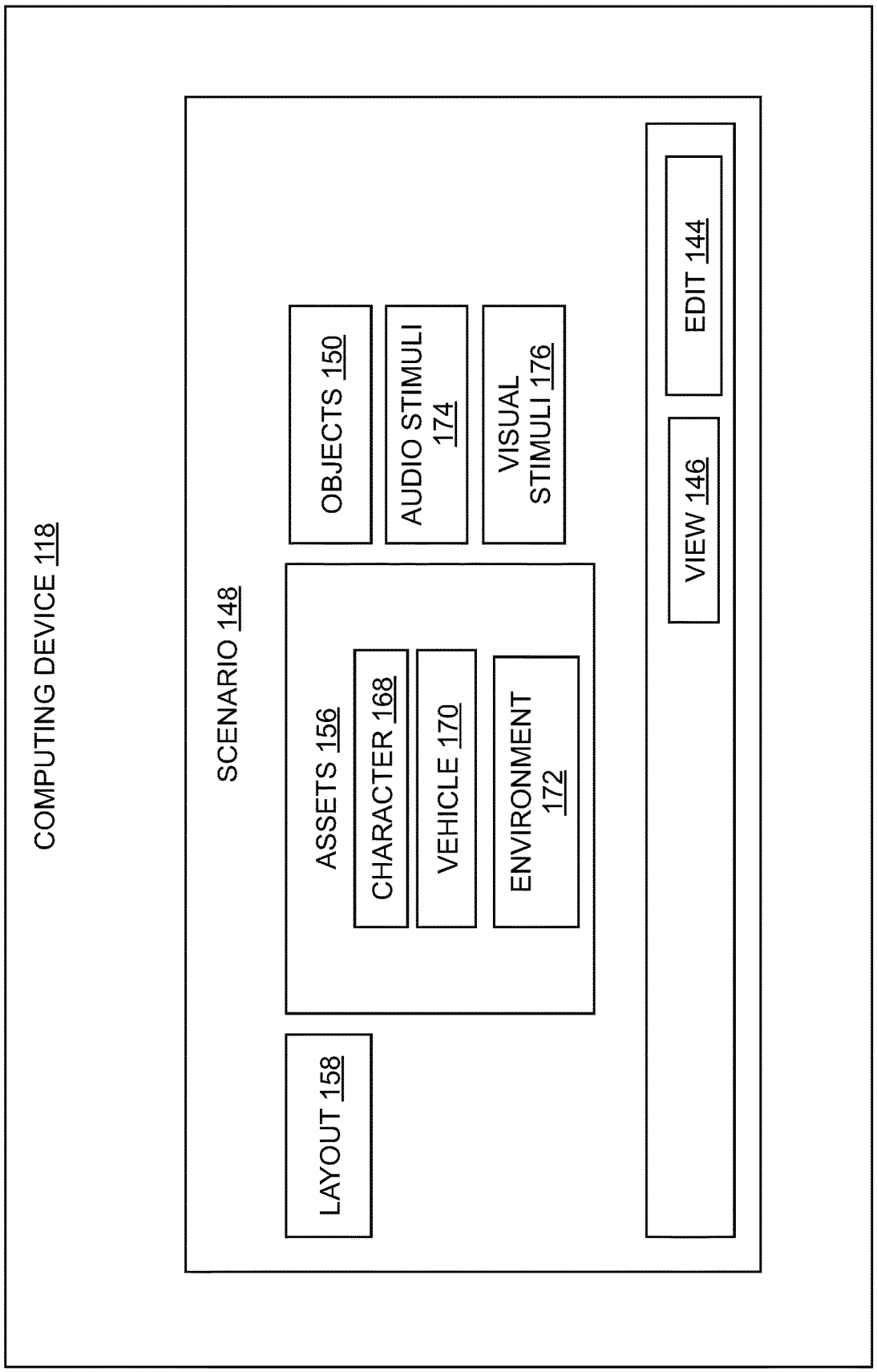
FIG. 10 depicts a block diagram of a scenario displayed on a computing device, according to at least some embodiments disclosed herein.

As described, the first network switch 112 may transmit the position data of each position indicator 136 to the third network switch 116, where the third network switch 116 may be configured to transmit the position data of each position indicator 136 to a first computing device 118 (of FIG. 1, FIG. 4, and FIG. 10). It should be appreciated that the examples provided herein describe hardwiring of the first camera 104, the second camera 106, the first base station 108, and the second base station 110 to the first network switch 112 and the second network switch 114, respectively. It should be appreciated that in some examples, each of the first network switch 112, the second network switch 114, and the third network switch 116 may be PoE or PoE+ Gigabit Ethernet switches. However, it should be appreciated that wireless options are contemplated herein.

Moreover, it should be appreciated that a quantity of the cameras, the base stations, and the network switches is not limited to the illustrative examples disclosed herein. Each of the cameras (e.g., the first camera 104 and the second camera 106) may be balanced across the network switches to balance power consumption. For example, an OptiTrack 24-port Gigabit PoE/PoE+ switch for use with Ethernet cameras supports up to 23 PoE cameras (Prime13, Prime13 W, Slim 13E) or 12 PoE+ cameras (Prime41, Prime17 W) per network switch.

The first computing device 118 may comprise a simulation engine 124 (of FIG. 1 and FIG. 4) and a graphical user interface (GUI) 120 (of FIG. 1), among other components. In some examples, the simulation engine 124 is an application, a software program, a service, or a software platform executable on the first computing device 118. The simulation engine 124 of the first computing device 118 is configured to control the scenario 148 for the virtual reality system.

In some examples, the scenario 148 is a 3D scenario. In examples, the scenario 148 is a simulation scenario. In other examples, the simulation scenario may include: a video gaming simulation scenario, a situational awareness training simulation scenario, an entertainment simulation scenario, a military training simulation scenario, a law enforcement training simulation scenario, a fire fighter training simulation scenario, a flight simulation scenario, a science education simulation scenario, a medical training simulation scenario, a medical response simulation scenario, a mission rehearsal simulation scenario, or an architectural training simulation scenario, among other examples. A third user 122 (of FIG. 1) may be configured to interact with the first computing device 118 via the GUI 120.

The first computing device 118 may also be communicatively coupled to a server 164 (of FIG. 1). In some examples, the first computing device 118 may further be communicatively coupled to a second computing device 162. A fourth user 166 (of FIG. 1) may interact with the GUI 120 of the second computing device 162.

In some examples, the simulation engine 124 of the first computing device 118 may be configured to generate the 3D scenario (e.g., the scenario 148), with images and textures being programmed into graphics engines (not shown) on the first computing device 118. Additionally, the images may be created from digitized photos or video or from scanned images. These virtual images and their 3D characterizations are stored in computer memory on the first computing device 118, as depicted and described in FIG. 15.

These stored images are manipulated to produce a virtual reality image signal that is presented for displaying to the first user 126 and/or the second user 128. In examples, the simulation engine 124 of the first computing device 118 may transmit the 3D virtual world scenario (e.g., the scenario 148) to the head-mounted display 130 for display to the first user 126 and/or the second user 128. The head-mounted display 130 may project an image or symbology on a user interface/visor or a reticle of the wearer (e.g., the first user 126 or the second user 128). The head-mounted display 130 may also incorporate a positioning system (not shown) that tracks the head position and angle of the wearer (e.g., the first user 126 or the second user 128), so that the picture or symbology projected by the display is congruent with the outside world using see-through imagery. In even further examples, the head-mounted display 130 may also be used with tracking sensors (such as the position indicator 136 or others) that allow changes of angle and orientation of the wearer/user (e.g., the first user 126 or the second user 128) to be recorded. When such data is available to the system providing the virtual reality environment, it can be used to generate a display that corresponds to the wearer's the angle-of-look at the particular time. This allows the wearer (e.g., the first user 126 or the second user 128) to "look around" a virtual reality environment simply by moving the head without the need for a separate controller to change the angle of the imagery.

In further examples, the head-mounted display 130 may be a virtual reality head-mounted display. In other examples, the head-mounted display 130 may be a visor or a helmet, among other configurations not explicitly listed herein. In additional examples, the head-mounted display 130 may include a user interface 172 (of FIG. 7) that is transparent until a virtual reality image/scenario is displayed and may also include a headset 170 (of FIG. 7) configured to transmit audio to the one or more users (e.g., the first user 126 and/or the second user 128) while the one or more users (e.g., the first user 126 and/or the second user 128) are engaging with the virtual reality system.

A method for providing the virtual reality system comprises numerous process steps. To begin the process, a user must turn on the virtual reality system, calibrate the virtual reality system, check the equipment of the virtual reality system (e.g., the first camera 104, the second camera 106, the first base station 108, the second base station 110, the one or more wearable devices, etc.), test the equipment, and engage in donning and doffing of the equipment.

Figure 9:
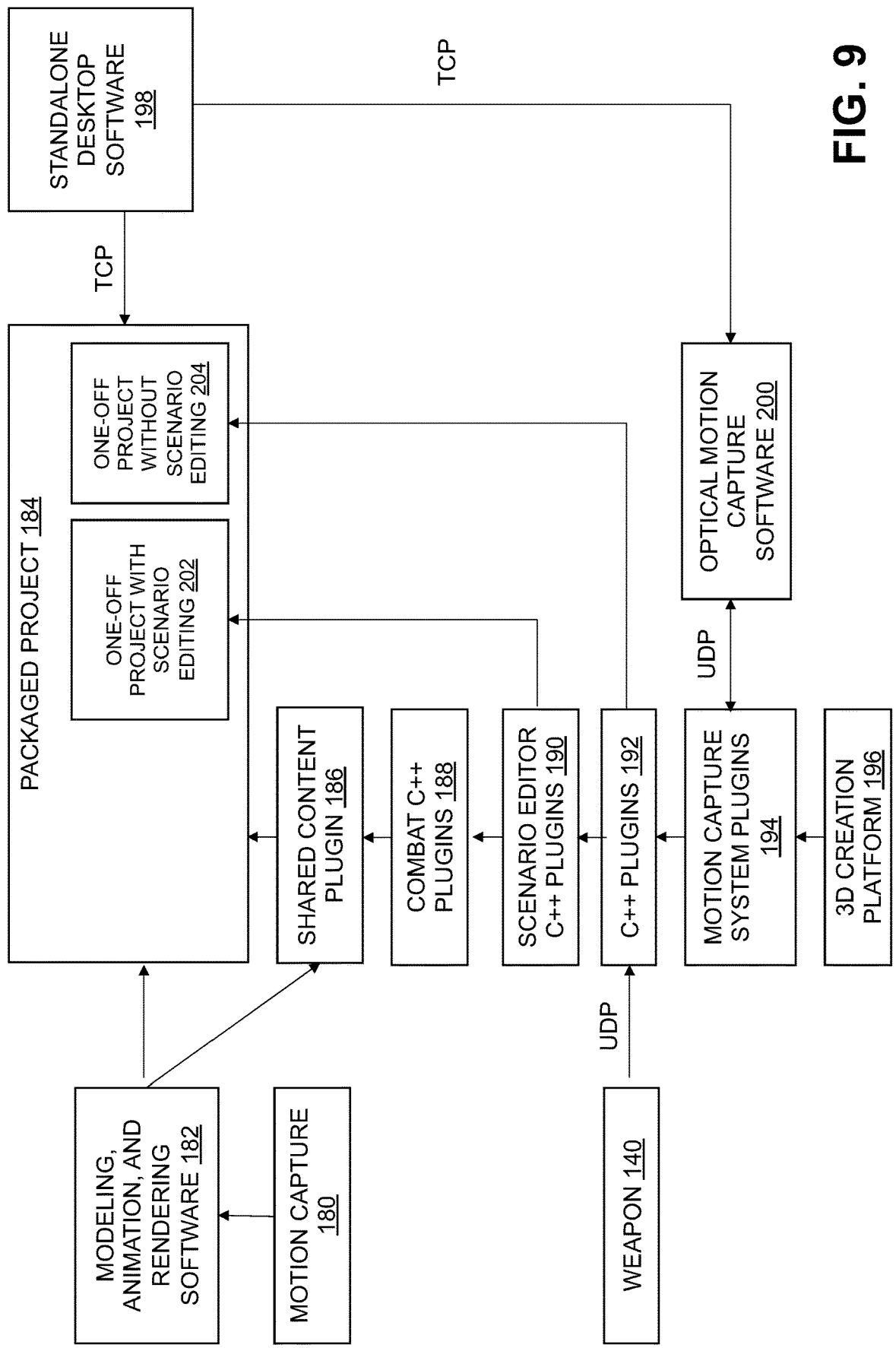
FIG. 9 depicts a block diagram of a development stack, according to at least some embodiments disclosed herein.

Moreover, as explained, the simulation engine 124 is an application, a software program, a service, or a software platform executable on the first computing device 118. In examples where the simulation engine 124 is the application, the development stack used for application deployment is depicted in FIG. 9. It should be appreciated that "deployment stack" refers to the set of languages, libraries, integrated development environments (IDEs) and tools (including OS, database server and application server) used for application development.

As depicted in FIG. 9, the deployment stack may include: modeling, animation and rendering software 182 (such as a DCC application, e.g., 3dsmax), the weapon 140 (e.g., Ardunio code), motion capture 180, the packaged project 184, one-off projects with scenario editing 202, one-off projects without scenario editing 204, standalone desktop software 198 (e.g., a software launcher), shared content plugin 186 (e.g., blueprints plugin), combat C++ plugins 188 (e.g., pawn logic and game logic, weapons, and shared combat related assets), scenario editing C++ plugins 190 (e.g., core functionality and interfaces, user interfaces, and system assets), C++ plugins 192 (e.g., VAUtils C++ plugins), motion capture system plugins 194 (e.g., Optitrack plugins, NatNet and Optitrack Oculus), optical motion capture software 200 (e.g., Optitrack Motive), and a 3D creation platform 196 (e.g., Unreal Engine 4).

Each packaged project 184 may have its own JSON file that contains information, such as a quantity and types of users/players in the packaged project 184, what settings should be shown in the standalone desktop software 198, what statistics are tracked, etc. This information is consumed by the standalone desktop software 198 to define a user interface of the packaged project 184. In examples, the shared content plugin 186 may be used when multiple projects need to share a unified framework. Such shared content may include: avatar and characters, common scenario editor assets, shared animations and audio, and specific game logic.

In examples, the C++ plugins 192 may include virtual reality and tracking framework, ballistics and weapons functionality, operator framework, integration of the standalone desktop software 198, spectator features, replay and statics functionality, voice chat, and cosmetic effects. In examples, the standalone desktop software 198 (e.g., software launcher) may be executable on the first computing device 118. In other examples, the standalone desktop software 198 may configure and launch packages (e.g., the packaged project 184) simultaneously on multiple machines (such as the first computing device 118 and the second computing device 162), review statics and launch replays, launch scenario editing and manage saved scenarios, configure the optical motion capture software 200 for the launched package, and create and edit files.

FIG. 10 depicts a block diagram of a scenario (e.g., the scenario 148) displayed on a computing device (e.g., the first computing device 118) and FIG. 11-FIG. 14 depict schematic diagrams of scenarios (e.g., the scenario 148) rendered by a simulation engine 124 of the computing device (e.g., the first computing device 118) and displayed to a user via the GUI 120 of the computing device (e.g., the first computing device 118), according to at least some embodiments disclosed herein.

As depicted in FIG. 10, the simulation engine 124 may comprise custom and client-facing scenario authoring or editing tools. Such client-facing scenario authoring or editing tools allow for an endless amount of options for what unfolds through the scenario 148 (e.g., of at least FIG. 10, FIG. 11, FIG. 12, FIG. 13, and FIG. 14). In some examples, the simulation engine 124 may comprise custom and client-facing scenario authoring or editing tools geared towards multi-participant and free-roaming virtual reality systems. The authoring or editing tools of the simulation engine 124 may allow one or more users to view 146 (of FIG. 10 and FIG. 11) and/or edit 144 (of FIG. 10 and FIG. 11) a given scenario 148.

The custom and client-facing scenario authoring or editing tools are non-limiting and may allow the one or more users to first select a base layout 158 (of FIG. 10). The base layout 158 for the scenario may include a school, a warehouse, a park, an office building, etc. Then, the custom and client-facing scenario authoring or editing tools allow the one or more users to drag and drop assets 156, objects 150, audio stimuli 174, and/or visual stimuli 176 (of FIG. 10, FIG. 11, FIG. 12, FIG. 13, and FIG. 14) into the base layout 158, allowing this software to be easily used by anyone.

The assets 156 may include character assets 168, vehicle assets 170, and/or environmental assets 172. In examples, the character assets 168 may include a civilian, a shooter, a criminal, an adult, or a child, among other examples not explicitly listed herein. The vehicle assets 170 may include numerous types of makes and models of vehicles. In other examples, the environmental assets 172 may include objects, such as a door, a barrier, a weather event, a blood splatter, a bloody footprint, a bullet casing, a bench, a table, a backpack, or a chair, among other examples not explicitly listed herein. In further examples, the audio stimuli 174 may include a gunshot audio stimuli, a screaming audio stimuli, a door opening audio stimuli, a door closing audio stimuli, or an audio stimuli associated with engaging a gun or a weapon, among other examples not explicitly listed herein. The visual stimuli 176 may include a shooting, a weather event (e.g., lightning or rain), among others. The objects 150 may include blood splatter, bloody footsteps, a deceased civilian, a door triggering, etc. It should be appreciated that examples of the base layout 158, the assets 156, the objects 150, the audio stimuli 174, and the visual stimuli 176 are provided for illustrative purposes only.

Figure 11:
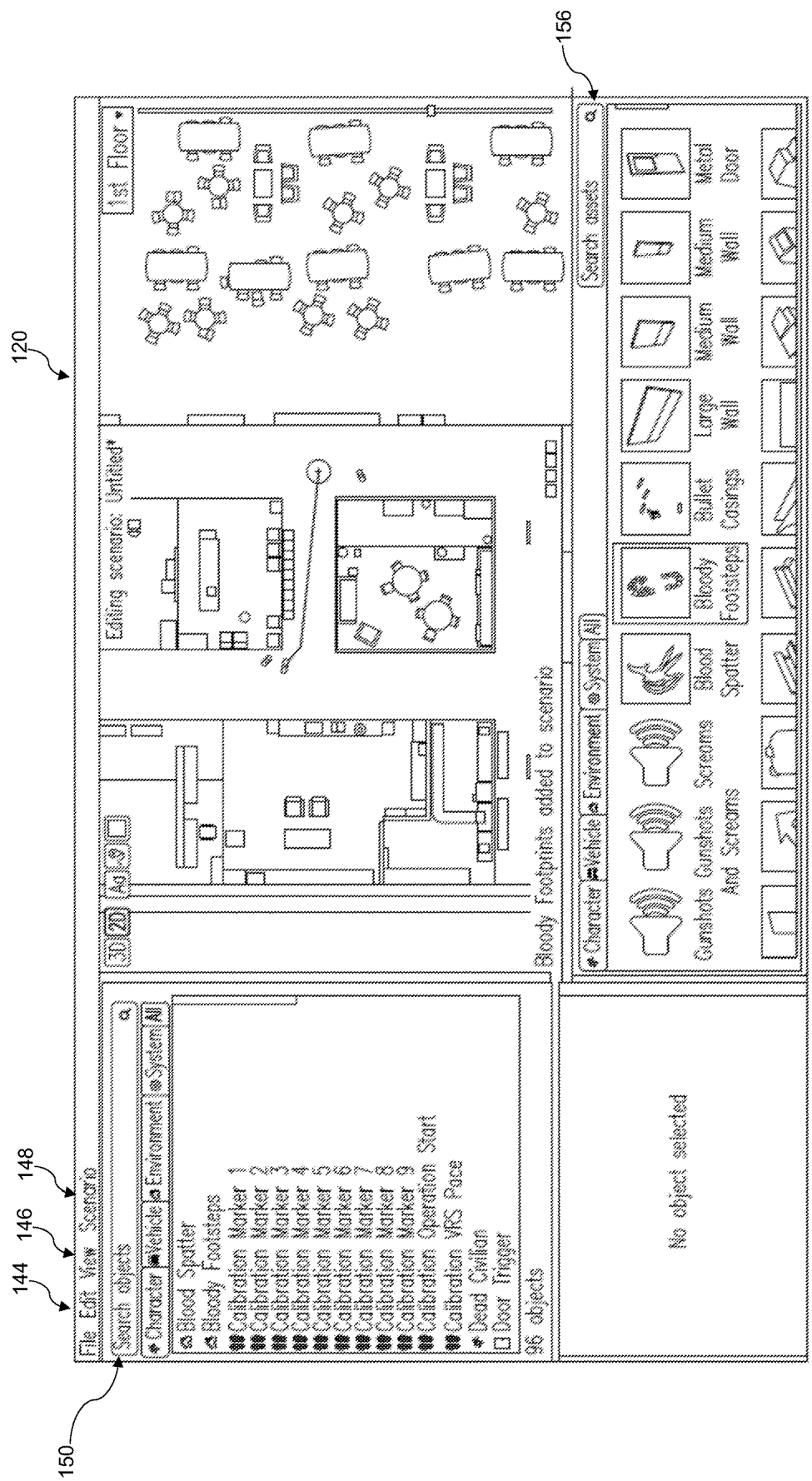
FIG. 11-FIG. 14 depict schematic diagrams of scenarios rendered by a simulation engine of a computing device and displayed to a user via a graphical user interface (GUI) of the computing device, according to at least some embodiments disclosed herein.
Figure 12:
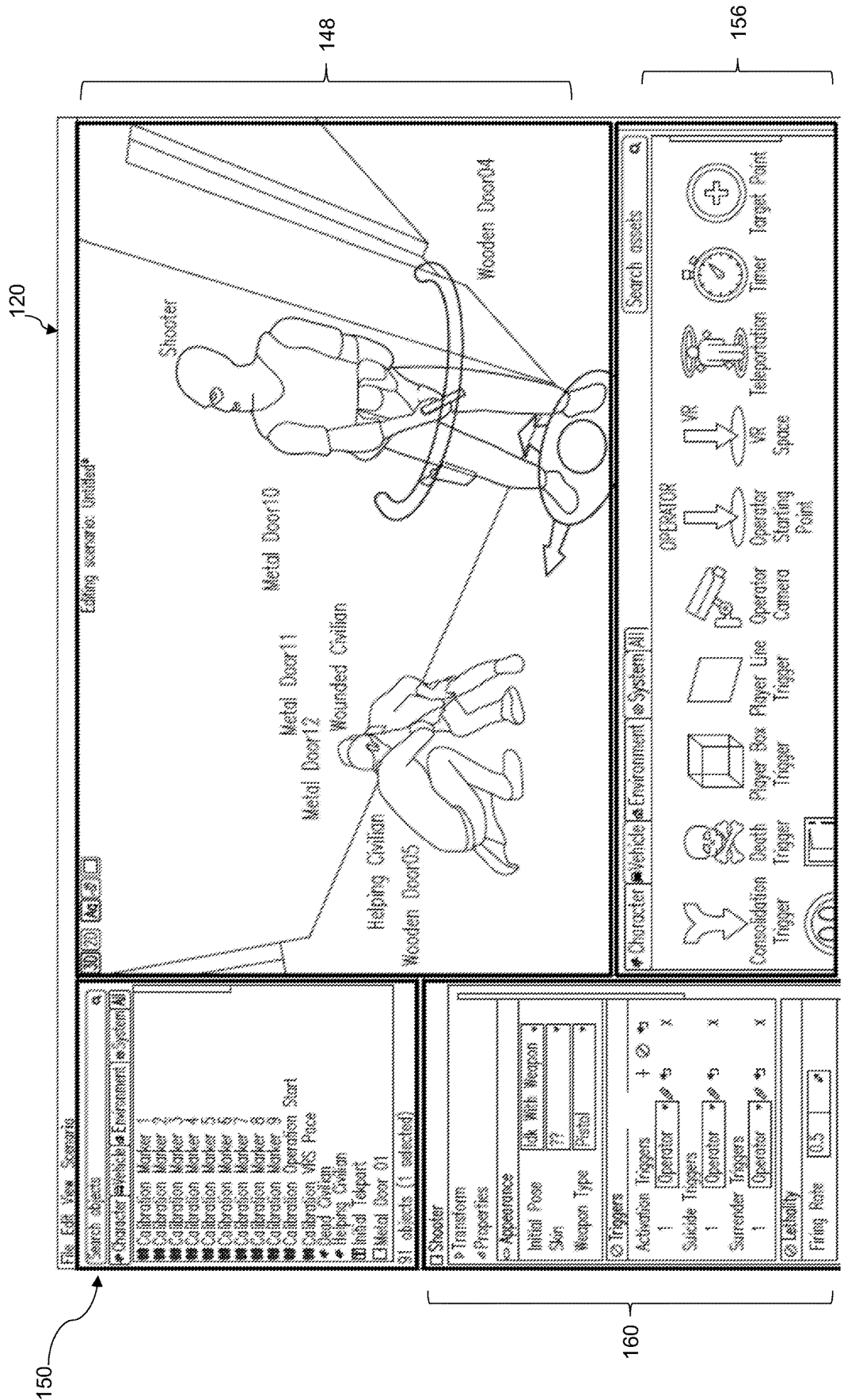
Figure 13:
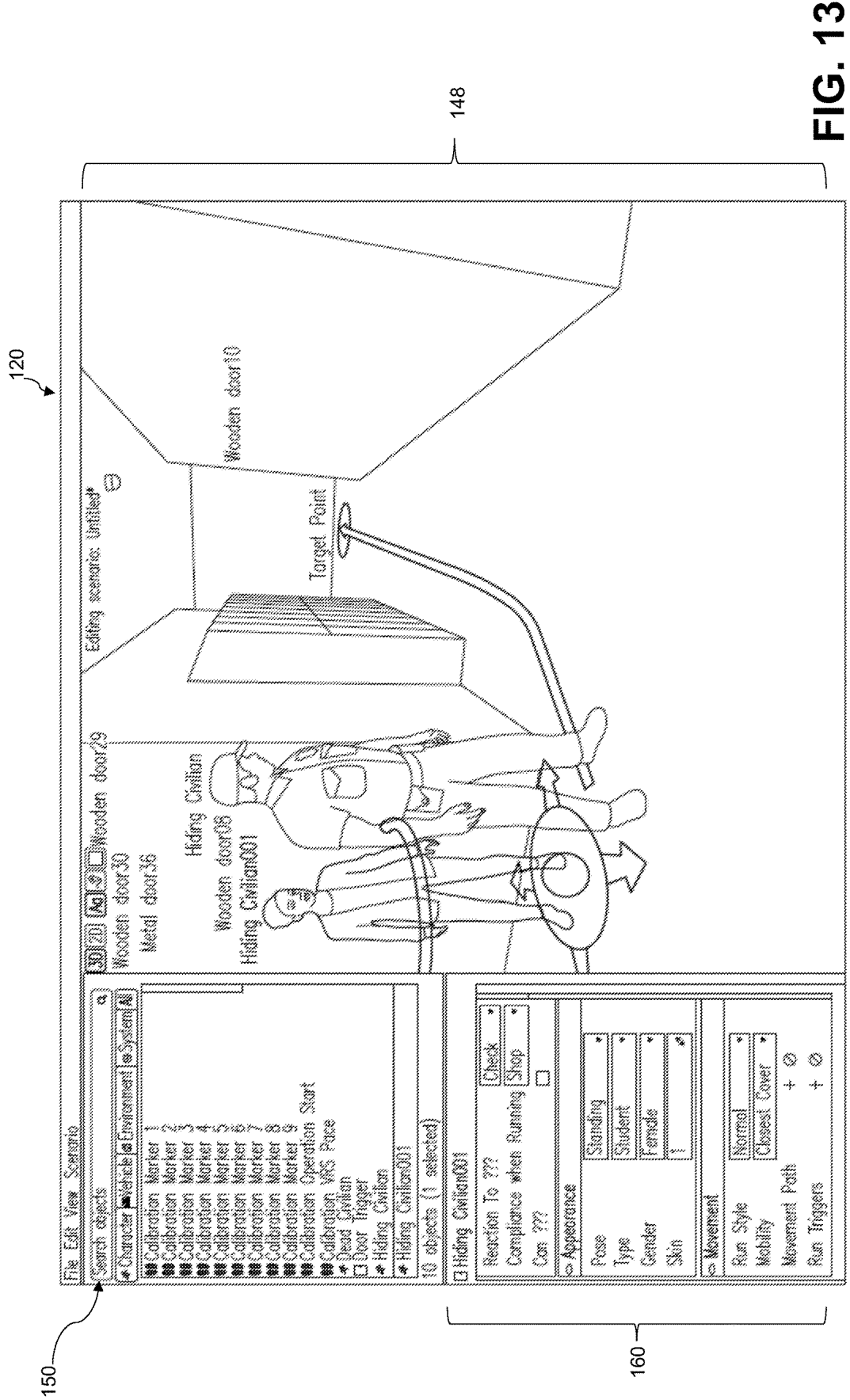
Figure 14:
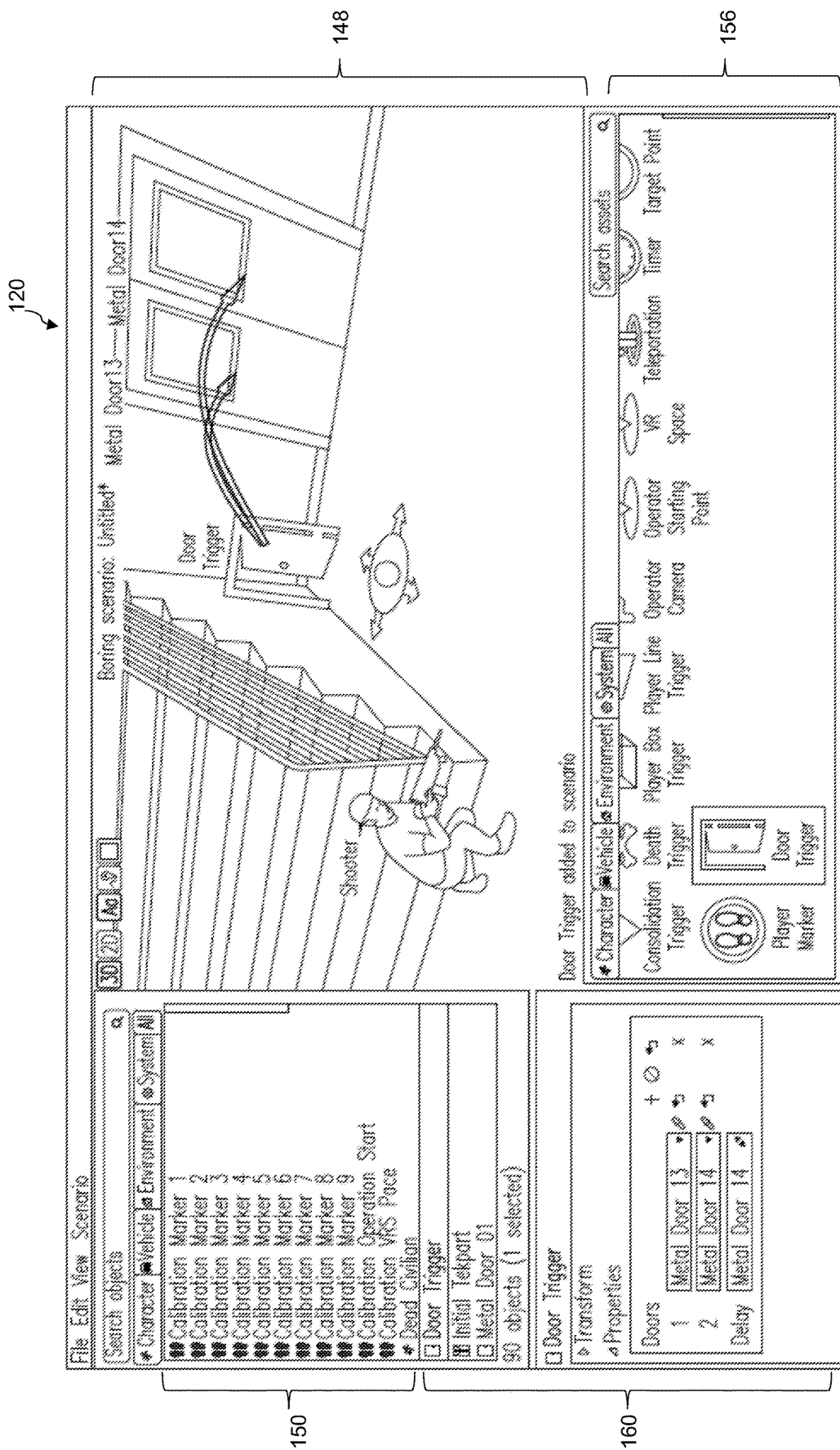

As shown in FIG. 11, a user (e.g., the third user 122 or the fourth user 166) may view the scenario 148 via the GUI 120 of the first computing device 118 and/or the second computing device 162. The third user 122 or the fourth user 166 may search the assets 156 and/or the objects 150. As depicted in FIG. 12, FIG. 13, and FIG. 14, the third user 122 or the fourth user 166 may modify any aspects of the assets 156 and/or the objects 150. For example, the third user 122 or the fourth user 166 may modify factors 160 of the assets 156 and/or the objects 150. In an example, the factor 160 may include an appearance of a character (e.g., a shooter) (e.g., height, weight, facial features, skin color, weapon type, and/or initial pose, etc.). In another example, the factor 160 may include a reaction of a civilian, an appearance of a civilian, and/or a movement of a civilian in response to a participant utilizing the system.

Once the scenario is completed, the simulation engine 124 may then revise/update the scenario based on the one or more actions. The updated scenario may be viewed as a "package" (e.g., the packaged project 184) which is the deliverable output of the developers' work. The "package" is a simulation process which contains one or more 3D environments and a bank of entities representing assets. Each package (e.g., the packaged project 184) may be launched in three distinct modes of operation, including a live simulation mode, an after-action review mode, and a scenario authoring mode.

The scenario authoring mode enables an end-user training authority (e.g., the third user 122 or the fourth user 166) to create or modify the scenario 148 based on the organization's needs. Such organization may include a law enforcement organization or a military organization, among others. In the scenario authoring mode, the simulation process is run with a dedicated What You See Is What You Get (WYSIWYG) user interface, that allows the user (e.g., the third user 122 or the fourth user 166) to perform numerous actions, such as: view and navigate the included environment(s) in 3D overhead modes, augment the environment layout to create different tactical challenges, control lighting and weather conditions, create a mapping between a physical training space to a specific virtual space in the environment, define teleportation mechanisms between different points in the environment, insert entities from the entity bank into the environment, configure each entity's appearance and behavior, and/or set up logic triggers which affect the scenario based on timers, actions of the trainees, actions of the operator(s) and other scenario related events. The user (e.g., the third user 122 or the fourth user 166) may then save their work.

The data produced in the user interface by the user (e.g., the third user 122 or the fourth user 166) may be serialized to a JSON file and added to the bank of scenario configurations of the package. When the package (e.g., the packaged project 184) is executed in a live simulation session or in after-action review mode, the serialized data is loaded and the entities defined in the data are spawned in the environment.

In examples of the live simulation session, the simulation engine 124 may transmit the 3D virtual world scenario (e.g., the scenario 148) to the user interface 172 of the head-mounted display 130 for display to the first user 126 and/or the second user 128. It should be appreciated that the 3D virtual world scenario unfolds and maneuvers based on the actions of the participants within the system. In some examples, the scenario 148 may utilize teleport triggers to teleport the players/participants (e.g., the first user 126 and/or the second user 128) in order to change the orientation of the scenario 148.

The first camera 104 and/or the second camera 106 may track and identify a position of each position indicator 136 while the first user 126 and/or the second user 128 are freely roaming the physical environment 102. The first camera 104 and/or the second camera 106 may transmit the position data of each position indicator 136 to the first network switch 112. The first network switch 112 may transmit the position data of each position indicator 136 to the third network switch 116. The third network switch 116 may then transmit the position data of each position indicator 136 to the simulation engine 124 of the first computing device 118.

Once the simulation engine 124 of the first computing device 118 receives the position data of each position indicator 136, the simulation engine 124 may then determine a position of the physical object from the position data and may generate a virtual reality image of the physical object. The simulation engine 124 may also apply a predetermined visual texture to the associated object, create an associated texture (e.g., a 2D texture, a 3D texture, or an effect) and then include the associated texture in the virtual reality image.

In some examples, a processing module may include a graphics processing unit (of FIG. 15) for generating the virtual reality image. The identity of an associated object, a predetermined visual texture or 2D or 3D image of the object, and an application of the predetermined visual texture to the associated object may be stored in a memory (of FIG. 15) of the first computing device 118. The memory of FIG. 15 may also be used to store a virtual image of the associated object. The simulation engine 124 may then add the virtual reality image of the object into the virtual reality scenario 148 and may transmit the modified virtual reality scenario to the head-mounted display 130 for display to the first user 126 and/or the second user 128.

Optionally, the simulation engine 124 may then display the virtual reality scenario on the GUI 120 of the first computing device 118 or a second computing device 162 for display to one or more users, such as the third user 122 and/or the fourth user 166. Optionally, the simulation engine 124 may also be configured to generate an audio signal associated with the virtual reality image of the physical object and transmit the audio signal to the headset 170 coupled to the head-mounted display 130 for the first user 126 and/or the second user 128 to hear while engaging in the virtual reality system.

While the first user 126 and/or the second user 128 are engaging in the virtual reality system or after the first user 126 and/or the second user 128 have finished engaging in the virtual reality system, the 3D virtual reality scenario may be rendered by the simulation engine 124 for display via the GUI 120 of the first computing device 118 and/or the second computing device 162. One or more users, such as the third user 122 and/or the fourth user 166 may engage with custom and client-facing scenario authoring or editing tools of the simulation engine 124. In examples, a user (such as the third user 122) may interact with the GUI 120 on the first computing device 118 and may engage in one or more actions to modify the 3D virtual reality scenario. Such actions may include an addition, a deletion, and/or a modification of the assets 156, the objects 150, the audio stimuli 174, and/or the visual stimuli 176. The simulation engine 124 may then revise/update the scenario based on the one or more actions by the third user 122.

In other examples, the simulation engine 124 may receive, from a user (such as the third user 122 or another user), a request to replay the 3D virtual reality scenario in the after-action review mode. Such request for a replay or after-action review may be for training purposes (e.g., to train the first user 126 and/or the second user 128) and provides endless feedback to the first user 126 and/or the second user 128. In response, the simulation engine 124 may replay the scenario on the first computing device 118 or may transmit the scenario to the second computing device 162 to replay to another user (e.g., the fourth user 166).

Systems, Devices, and Operating Systems

A basic configuration 232 of a computing device 222 (such as the first computing device 118 or the second computing device 162 of FIG. 1) is illustrated in FIG. 15 by those components within the inner dashed line. In the basic configuration 232 of the computing device 222, the computing device 222 includes a processor 234 and a system memory 224. The terms "processor" and "central processing unit" or "CPU" are used interchangeably herein. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (μP), a microcontroller (μf), and a digital signal processor (DSP), or any combination thereof. In examples, the microprocessor may be AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s).

Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an operating system 226, one or more engines, such as a simulation engine 124, and program data 230. In some embodiments, the simulation engine 124 may be an application, a software program, a service, or a software platform, as described infra. The system memory 224 may also include a storage engine 228 that may store any information of data disclosed herein.

The operating system 226 may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (B S D) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Microsoft Windows 8 OS, Microsoft Windows 10 OS, Palm OS, and/or the like. The operating system 226 may be one specifically optimized to be run on a mobile computing device (such as the first computing device 118 or the second computing device 162 of FIG. 1), such as iOS, Android, Windows Phone, Tizen, Symbian, and/or the like.

As explained supra, the GUI 120 may provide a baseline and means of accessing and displaying information graphically to users. The GUI 120 may include Apple Macintosh Operating System's Aqua, IBM's OS/2, Microsoft's Windows 2000/2003/3.1/95/98/CE/Millennium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, or Yahoo! User Interface, any of which may be used.

Additionally, a web browser component (not shown) is a stored program component that is executed by the CPU. The web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices.

A web browser may communicate to and/or with other components in a component collection, including itself, and/or facilities of the like. Most frequently, the web browser communicates with information servers, operating systems (such as the operating system 226), integrated program components (e.g., plug-ins), and/or the like; e.g., it may contain, communicate, generate, obtain, and/or provide program component, system, user, and/or data communications, requests, and/or responses. Of course, in place of a web browser and an information server, a combined application may be developed to perform similar functions of both. The combined application would similarly affect the obtaining and the provision of information to users, user agents, and/or the like from the enabled nodes of the present invention.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers (such as the server 164 of FIG. 1), the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Another embodiment of the invention provides a method that performs the process steps on a subscription, advertising, and/or fee basis. That is, a service provider can offer to assist in the method steps of providing the virtual reality system. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A virtual reality system comprising:
   a physical environment defined at least partially by a two- or three-dimensional physical coordinate system, the physical environment comprising one or more physical objects;
   one or more users located in the physical environment,
      wherein each of the one or more users are configured with wearable devices and a weapon, each user having a wearable device comprising a backpack, and
      wherein each of the one or more backpacks and the weapon comprise a position indicator configured to detect position data in the physical environment, the position indicators being secured to respective outer surfaces of the one or more backpacks;
   a first computing device communicatively coupled to a server; and
   the physical environment comprising:
      a first network switch;
      a second network switch;
      at least two cameras positioned relative to one another to create the 3D capture volume, the at least two cameras being physically separated from the one or more users located in the physical environment, at least one camera being fixed to an stationary elongate member having a horizontal orientation, the at least one camera having a horizontal orientation, the configuration of the at least two cameras providing for the cameras to:
         monitor a portion of the physical environment;
         capture the position data of each position indicator within the portion of the physical environment;
         capture the position data of the one or more users located in the physical environment and
         transmit the position data of each position indicator and the one or more users within the portion of the physical environment to the first network switch;
      one or more base stations affixed to the second network switch and configured to emit radio frequency signals to synchronize each position indicator within the physical environment; and
      a third network switch affixed to the first network switch and the second network switch, the third network switch being configured to transmit the position data of each position indicator within the portion of the physical environment to the first computing device.

2. The virtual reality system of claim 1, wherein the wearable devices further comprise: a head-mounted display, at least one ankle strap, and at least one wrist strap.

3. The virtual reality system of claim 2, wherein the head-mounted display is a virtual reality head-mounted display.

4. The virtual reality system of claim 3, wherein the head-mounted display comprises:
   a user interface configured to display a virtual reality scenario to the user while the user is engaging with the virtual reality system; and a headset configured to transmit audio to the user while the user is engaging with the virtual reality system.

5. The virtual reality system of claim 1, wherein the first computing device comprises a simulation engine configured to control a scenario for the virtual reality system.

6. The virtual reality system of claim 5, wherein the scenario is a simulation scenario, and wherein the simulation scenario is selected from the group consisting of: a video gaming simulation scenario, a situational awareness training simulation scenario, an entertainment simulation scenario, a military training simulation scenario, a law enforcement training simulation scenario, a fire fighter training simulation scenario, a flight simulation scenario, a science education simulation scenario, a medical training simulation scenario, a medical response simulation scenario, a mission rehearsal simulation scenario, and an architectural training simulation scenario.

7. A method executed by a simulation engine of a computing device for providing a virtual reality system, the method comprising:
   receiving a selection of a base layout of a scenario from a first user;
   receiving an action associated with a parameter of the scenario;
   executing the action to modify the scenario;
   transmitting the modified scenario to a user interface of a head-mounted display worn by a second user freely roaming a physical environment of the virtual reality system, wherein the physical environment is defined at least partially by a physical coordinate system, the second user having a wearable device comprising a backpack, the outer surface of the backpack having a position indicator secured thereto, the position indicator configured to detect position data in the physical environment;
   receiving position data associated with an object and captured by one or more cameras within the physical environment, at least one camera being fixed to an stationary elongate member having a horizontal orientation, the at least one camera having a horizontal orientation;
   determining a position of the object from the position data;
   generating a virtual reality image of the object;
   adding the virtual reality image of the object into the modified scenario;
   transmitting the updated scenario to the user interface of the head-mounted display worn by the second user; and
   launching the updated scenario as a package in three distinct modes of operation including a live simulation mode, an after-action review mode, and a scenario authoring mode.

8. The method of claim 7, wherein the action is selected from the group consisting of: a modification action, a deletion action, and an addition action, and wherein the parameter is selected from the group consisting of: an asset, an audio stimuli, and a visual stimuli.

9. The method of claim 7, wherein the action is a drag and drop action to add or delete the parameter from the scenario.

10. The method of claim 8, wherein the asset is selected from the group consisting of: a character asset, a vehicle asset, and an environmental asset.

11. The method of claim 7, wherein the scenario is a three-dimensional (3D) scenario.

12. The method of claim 7, wherein the wearable device further comprises at least one ankle strap, and at least one wrist strap.

13. The method of claim 7, further comprising:
   generating an audio signal associated with the virtual reality image of the object; and
   transmitting the audio signal to a headset coupled to the head-mounted display for the second user to hear while engaging in the virtual reality system.

14. The method claim 7, further comprising:
   transmitting the scenario to a graphical user interface of another computing device for display to a third user;
   receiving, from the third user, the one or more actions to modify the parameter of the scenario, wherein the one or more actions are selected from the group consisting of: a modification action, a deletion action, and an addition action, and wherein the parameter is selected from the group consisting of: an asset, an audio stimuli, and a visual stimuli; and
   updating the scenario based on the one or more actions.

15. A computing device comprising one or more processors, one or more memories, and one or more computer-readable hardware storage devices, the one or more computer-readable hardware storage devices containing program code executable by the one or more processors via the one or more memories to implement a method for providing a virtual reality system, the method comprising:
   receiving a selection of a base layout of a three-dimensional (3D) scenario from a first user;
   receiving an action associated with a parameter of the 3D simulation scenario, wherein the action is selected from the group consisting of an addition action, a modification action, and a deletion action, wherein further the parameter is selected from the group consisting of: an asset, an audio stimuli, and a visual stimuli;
   executing the action to modify the 3D simulation scenario;
   transmitting the modified 3D simulation scenario to a user interface of a head-mounted display worn by a second user freely roaming a physical environment of the virtual reality system, wherein the physical environment is defined at least partially by a physical coordinate system, the second user having a wearable device comprising a backpack, the outer surface of the backpack having a position indicator secured thereto, the position indicator configured to detect position data in the physical environment;
   receiving position data associated with an object and captured by one or more cameras within the physical environment, wherein at least one camera is fixed to a stationary elongate member having a horizontal orientation, the at least one camera having a horizontal orientation, the object being selected from the group consisting of: the second user, a wearable device worn by the second user, a weapon used by the second user, and a physical object;
   determining a position of the object from the position data;
   generating a virtual reality image of the object;
   adding the virtual reality image of the object into the modified 3D simulation scenario; and
   transmitting the updated 3D simulation scenario to the user interface of the head-mounted display worn by the second user.

16. The computing device of claim 15, wherein the asset is selected from the group consisting of: a character asset, a vehicle asset, and an environmental asset.

17. The computing device of claim 15, wherein the method further comprises:

transmitting the 3D simulation scenario to a graphical user interface of another computing device for display to a third user;
receiving, from the third user, the one or more actions to modify the parameter of the 3D simulation scenario; and
updating the 3D simulation scenario based on the one or more actions.

18. The computing device of claim 15, wherein the 3D simulation scenario is a law enforcement training simulation scenario.

19. The computing device of claim 15, wherein the wearable device further comprises at least one ankle strap, and at least one wrist strap.

\* \* \* \* \*